(12) United States Patent
Kamakura

(10) Patent No.: US 12,307,893 B2
(45) Date of Patent: May 20, 2025

(54) DRIVING ASSISTANCE APPARATUS

(71) Applicant: Honda Motor Co., Ltd., Tokyo (JP)

(72) Inventor: Hiroshi Kamakura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 243 days.

(21) Appl. No.: 17/982,502

(22) Filed: Nov. 7, 2022

(65) Prior Publication Data
US 2023/0154322 A1 May 18, 2023

(30) Foreign Application Priority Data
Nov. 15, 2021 (JP) .................. 2021-185414

(51) Int. Cl.
*G08G 1/0967* (2006.01)
*D21D 1/00* (2006.01)
(Continued)

(52) U.S. Cl.
CPC ....... *G08G 1/096741* (2013.01); *D21D 1/002* (2013.01); *D21D 1/38* (2013.01); *G06F 3/14* (2013.01); *G08G 1/052* (2013.01)

(58) Field of Classification Search
CPC ............ G08G 1/096741; G08G 1/052; G08G 1/096783; G08G 1/096716; G08G 1/09623; G09G 2380/10; D21D 1/002; D21D 1/38; G06F 3/14; G06F 3/147; B60W 50/14; B60W 2050/146; B60W 30/16; B60W 2520/10; B60W 2556/50; B60W 30/14;
(Continued)

(56) References Cited

U.S. PATENT DOCUMENTS 3,819,932 A * 6/1974 Auer, Jr. ................. B61L 3/125
  246/187 B
4,272,800 A * 6/1981 Asatourian .............. B60Q 1/54
  362/489
(Continued)

FOREIGN PATENT DOCUMENTS

CN     111645703 A  *  9/2020  ............ B60W 40/10
JP     2014096016 A     5/2014

OTHER PUBLICATIONS

Translation of CN-111645703-A retrieved from Espacenet on Aug. 20, 2024 (Year: 2024).*

*Primary Examiner* — Thomas Ingram
*Assistant Examiner* — Faris Asim Shaikh
(74) *Attorney, Agent, or Firm* — Duft & Bornsen, PC

(57) ABSTRACT

A driving assistance apparatus including a display part, a detection part detecting a degree of approach from a subject vehicle to a preceding vehicle and a microprocessor. The microprocessor is configured to perform acquiring traffic light information including switching information on a traffic light and position information on a position of the subject vehicle with respect to the traffic light, deriving a recommended driving for the driver based on the traffic light information and the position information, and controlling the display part so as to notify the driver of information on a recommended vehicle speed included in the recommended driving, and further perform the controlling including controlling the display part so as to change and display information on a maximum value of the recommended vehicle speed included in the recommended driving in accordance with the degree of approach.

7 Claims, 5 Drawing Sheets

(51) Int. Cl.
  *D21D 1/38* (2006.01)
  *G06F 3/14* (2006.01)
  *G08G 1/052* (2006.01)

(58) Field of Classification Search
  CPC ......... B60W 2554/801; B60W 30/165; B60W 30/143; B60W 30/18163; B60W 2720/10; B60W 2554/804; B60W 2754/30; B60W 2552/00; B60W 2520/105; B60W 2555/60; B60W 2554/802; B60W 2554/4042; B60W 2510/104; B60W 2754/20; B60W 2754/00; B60K 31/185; B60K 35/29; B60K 2310/22; G01C 3/00; G06V 20/584; G06V 20/582; G06V 20/58
  See application file for complete search history.

(56) References Cited

U.S. PATENT DOCUMENTS

| | | | | |
|---|---|---|---|---|
| 10,773,640 | B2* | 9/2020 | Park ................... | B60W 40/105 |
| 10,894,541 | B2* | 1/2021 | Tomatsu ............. | B60W 30/146 |
| 11,565,711 | B2* | 1/2023 | Jeihani ................ | B60W 40/08 |
| 2002/0099491 | A1* | 7/2002 | Akabori ............... | B60W 30/16 |
| | | | | 180/170 |
| 2010/0087984 | A1* | 4/2010 | Joseph ................. | G09B 19/16 |
| | | | | 701/31.4 |
| 2013/0245945 | A1* | 9/2013 | Morita ................. | G08G 1/09675 |
| | | | | 701/533 |
| 2014/0222244 | A1* | 8/2014 | Ogawa ................ | G08G 1/096716 |
| | | | | 701/1 |
| 2015/0211878 | A1* | 7/2015 | Jiyama ............... | G01C 21/3629 |
| | | | | 701/439 |
| 2016/0137127 | A1* | 5/2016 | Yokochi ............... | G06V 20/588 |
| | | | | 348/148 |
| 2016/0272204 | A1* | 9/2016 | Takahashi ........... | B60W 30/165 |
| 2017/0313311 | A1* | 11/2017 | Niino .................... | B60W 40/04 |
| 2018/0253612 | A1* | 9/2018 | Koyama ............. | B60W 30/146 |
| 2019/0004529 | A1* | 1/2019 | Im ........................ | G08G 1/167 |
| 2019/0077404 | A1* | 3/2019 | Takeda ............. | B60W 30/0956 |
| 2019/0202457 | A1* | 7/2019 | Kito .................... | B60W 30/162 |
| 2020/0290630 | A1* | 9/2020 | Elwart ................. | B60W 40/08 |
| 2020/0312140 | A1* | 10/2020 | Kurehashi .............. | G08G 1/083 |
| 2021/0101601 | A1* | 4/2021 | Datta Gupta ......... | B60W 10/10 |
| 2022/0315055 | A1* | 10/2022 | Wang .................. | B60W 40/04 |
| 2023/0050063 | A1* | 2/2023 | Chen .................... | B60W 40/04 |

* cited by examiner

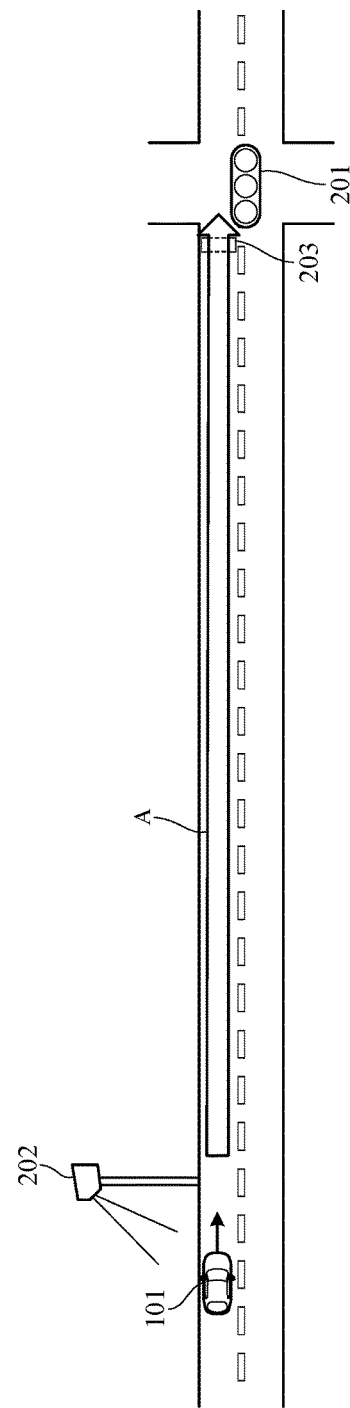

DRIVING ASSISTANCE APPARATUS

CROSS-REFERENCE TO RELATED APPLICATION

This application is based upon and claims the benefit of priority from Japanese Patent Application No. 2021-185414 filed on Nov. 15, 2021, the content of which is incorporated herein by reference.

BACKGROUND OF THE INVENTION

Field of the Invention

This invention relates to a driving assistance apparatus that assists a driving operation of a driver.

Description of the Related Art

Conventionally, as an apparatus of this type, there is a known apparatus that notifies a start timing of accelerator-off operation to a driver of the vehicle traveling on the road where the traffic light is installed. Such an apparatus is described, for example, in Japanese Unexamined Patent Publication No. 2014-096016 (JP2014-096016A). In the apparatus described in JP2014-096016A, a timing of a deceleration operation is notified to the driver via the display unit so that the vehicle can pass through the intersection where the traffic light is installed in a non-stop manner.

In a situation where there is a preceding vehicle traveling in front of the subject vehicle, by providing information in accordance with the situation to the driver, it is possible to suppress a decrease in the traffic smoothing while improving traffic safety without hindering the traffic flow in the vicinity. However, the device described in JP2014-096016A does not propose any information presentation to the driver when the preceding vehicle is present.

SUMMARY OF THE INVENTION

An aspect of the present invention is a driving assistance apparatus including: a display part displaying information; a detection part detecting a degree of approach from a subject vehicle to a preceding vehicle traveling ahead of the subject vehicle; and an electronic control unit including a microprocessor and a memory connected to the microprocessor. The microprocessor is configured to perform: acquiring traffic light information including switching information on a traffic light and position information on a position of the subject vehicle with respect to the traffic light, the traffic light informing a driver of stopping or non-stopping at a predetermined position; deriving a recommended driving for the driver, based on the traffic light information and the position information; and controlling the display part so as to notify the driver of information on a recommended vehicle speed included in the recommended driving. The microprocessor is configured to perform the controlling including controlling the display part so as to change and display information on a maximum value of the recommended vehicle speed included in the recommended driving in accordance with the degree of approach detected by the detection part.

BRIEF DESCRIPTION OF THE DRAWINGS

The objects, features, and advantages of the present invention will become clearer from the following description of embodiments in relation to the attached drawings, in which:

FIG. 1A is a diagram showing an example of a travel scene of a vehicle having a driving assistance apparatus according to an embodiment of the present invention;

DETAILED DESCRIPTION OF THE INVENTION

Figure 1B:
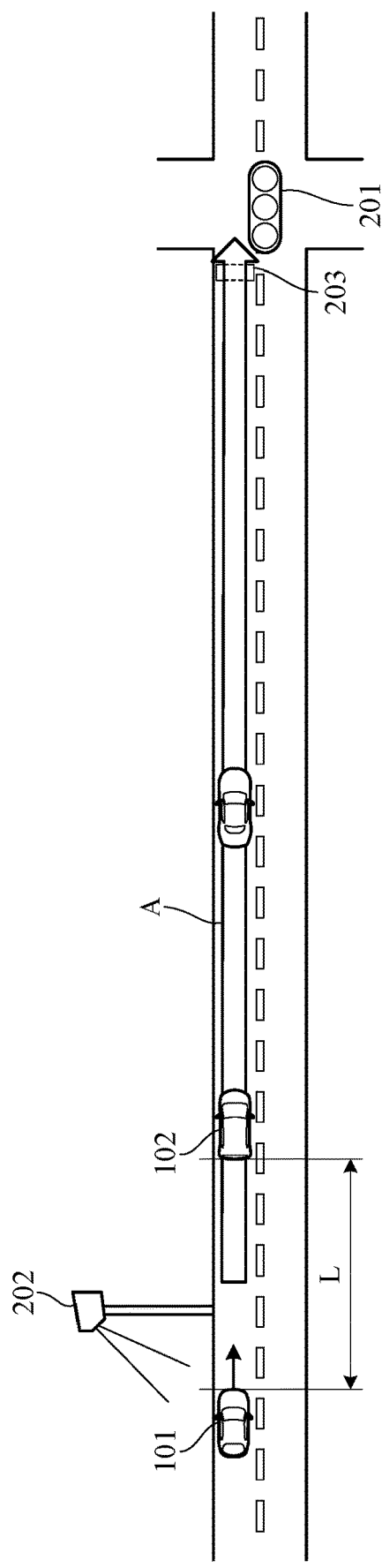
FIG. 1B is a diagram showing another example of the travel scene of the vehicle having the driving assistance apparatus according to the embodiment of the present invention.

Hereinafter, an embodiment of the present invention is explained with reference to FIGS. 1A to 5. FIGS. 1A and 1B are diagrams showing examples of travel scenes of a subject vehicle having a driving assistance apparatus according to an embodiment of the present invention. FIGS. 1A and 1B illustrates an example of the vehicle 101 traveling along an arrow "A" on a road on which a traffic light 201 is installed. In particular, in FIG. 1A, an example in which a preceding vehicle traveling ahead of the subject vehicle 101 does not exist in a section from the subject vehicle 101 to the traffic light 201 is illustrated, and in FIG. 1B, an example in which the preceding vehicle 102 exists in the section is illustrated.

The traffic light 201 is configured to sequentially switch between a red light indicating a stop instruction, a green light (a blue light) indicating that traveling is possible, and a yellow light indicating that traveling is possible but safe stop is difficult at a predetermined cycle. The traffic light may be an arrow traffic light which indicates a travelable direction by an arrow, rather than the light color is switched. The traffic light may be sequentially switched between green light and red light.

The vehicle 101 receives traffic light information on the traffic light 201 from a communication device (e.g., an optical beacon roadside unit 202) such as an optical beacon, a radio beacon installed on the side of the road. The traffic light information includes switching information of the traffic light 201, for example, switching information such as remaining time until the traffic light 201 switches from green to yellow and from red to green. FIG. 1A and FIG. 1B illustrate the example in which the subject vehicle 101 passes through the intersection where the traffic light 201 is installed without stopping, that is, the example in which the subject vehicle 101 travels without stopping at a stop line 203.

In the situation where the subject vehicle 101 travels toward the intersection where the traffic light 201 is installed in this way, the driving assistance apparatus according to the embodiment of the present invention is configured to provide predetermined information to the driver of the subject vehicle 101 based on the traffic light information received from the optical beacon roadside unit 202. That is, the driving assistance apparatus has a driving assistance function for notifying the driver of information (information of a target vehicle speed range) of a vehicle speed range in which the subject vehicle 101 can pass without stopping at the intersection, information of a deceleration instruction when the subject vehicle 101 stops at an intersection, and the like.

The information on the vehicle speed range and the information on the deceleration instruction are displayed on a display device provided on an instrument panel facing the driver. A display of a navigation unit disposed at the vicinity of the instrument panel can also be used as the display device. The display device may be configured by a head-up display for projecting an image on a panel provided at a windshield or near the windshield.

Figure 2A:
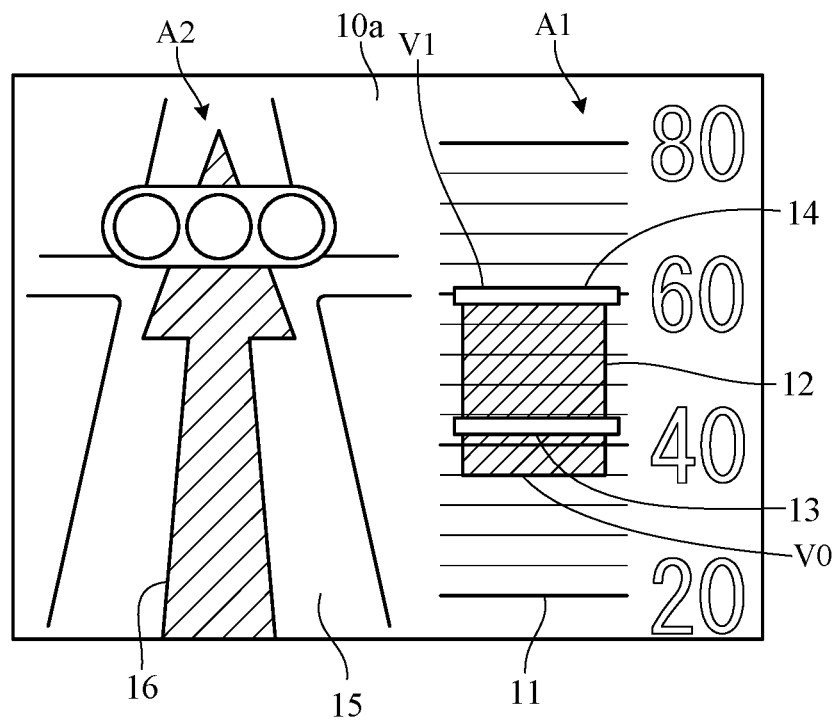
FIG. 2A is a diagram showing an example of a display screen by the driving assistance apparatus according to the embodiment of the present invention.

FIG. 2A is a diagram showing an example of a display screen 10a displayed on the display device (monitor) when the subject vehicle is approaching the traffic light. As shown in FIG. 2A, on the display screen 10a, an image indicating the target vehicle speed range is displayed in the area A1 of one of the left and right sides (e.g., the right side), and an image indicating whether or not the subject vehicle can pass through the intersection where the traffic light is installed without stopping is displayed in the area A2 of another of the left and right sides (e.g., the left side). FIG. 2A corresponds to the display screen 10a of the vehicle 101 traveling toward the traffic light 201 as shown in FIG. 1A, for example.

The image of the area A1 includes a scale image 11 indicating the vehicle speed on a scale along with a numerical value, a target vehicle speed image 12 (hatching) indicating the target vehicle speed range in which the subject vehicle can pass through the intersection where the traffic light ahead of the vehicle is installed without stopping, a bar-shaped subject vehicle speed image 13 indicating the current vehicle speed of the subject vehicle, and a bar-shaped legal speed image 14 indicating the legal speed of the road. The target vehicle speed image 12, the subject vehicle speed image 13, and the legal speed image 14 are displayed on the scale image 11 in association with the scale image 11. The monitor has a color display. The scale image 11, the target vehicle speed image 12, the subject vehicle speed image 13, and the legal speed image 14 are displayed in different colors from each other. The target vehicle speed image 12 is indicated by a belt-shaped image extending from the minimum value V0 to the maximum value V1 of the target vehicle speed. In FIG. 2A, the maximum value of the target vehicle speed range coincides with the legal speed. The display of the legal speed image 14 may be omitted.

In the area A2, a background image 15 schematically showing a road and a traffic light, and a driving behavior image 16 (hatching) indicating that the subject vehicle can travel without stopping at the intersection where the traffic light is installed, are displayed. The driving behavior image 16 is an image showing the driving behavior of the subject vehicle 101 passing through the intersection where the traffic light 201 is installed without the subject vehicle 101 stopping. If the subject vehicle speed is within the target vehicle speed range, the subject vehicle can travel without stopping at the intersection. In response to this situation, in the example of FIG. 2A, the driving behavior image 16 is represented by an image of an arrow exceeding the traffic light image on the road image of the background image 15. Thus, on the display screen 10a, the subject vehicle speed image 13 indicating the current vehicle speed is displayed in association with the target vehicle speed image 12 indicating the target vehicle speed range, and further, the driving behavior image 16 of the subject vehicle is displayed. Therefore, the driver can easily grasp necessity of acceleration and deceleration of the subject vehicle for smoothly passing through the intersection where the traffic light is installed, and good driving assistance for the driver is possible.

Figure 2B:
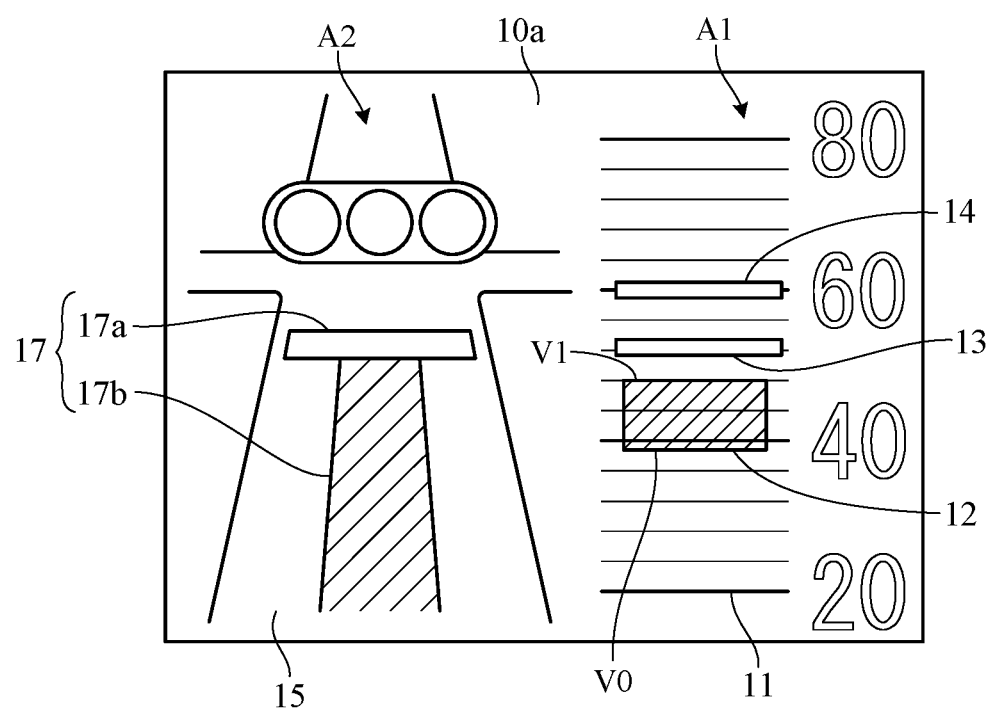
FIG. 2B is a diagram showing another example of the display screen by the driving assistance apparatus according to the embodiment of the present invention.

If the traffic light switches from green to red before the subject vehicle reaches the traffic light, or if the traffic light is still red when the subject vehicle reaches the traffic light, the subject vehicle needs to stop in front of the traffic light. FIG. 2B is a diagram illustrating an example of the display screen 10a in such a case. FIG. 2B corresponds to the display screen 10a when the subject vehicle stops at the stop line 203 in front of the traffic light 201 in FIG. 1, for example.

As shown in FIG. 2B, the target vehicle speed image 12, the subject vehicle speed image 13, and the legal speed image 14 are displayed in the area A1. The target vehicle speed image 12 is an image showing the target vehicle speed range for the traveling vehicle to stop smoothly on the stop line while suppressing the deceleration to a predetermined value or less. The target vehicle speed image 12 may be omitted. In the area A2, a deceleration instruction image 17 indicating the deceleration instruction of the vehicle is displayed on the background image 15. Specifically, the deceleration instruction image 17 including an image 17a of the stop line and a band-shaped image 17b as shown by hatching toward the image 17a is displayed. Thus, when the deceleration of the subject vehicle is required to stop the subject vehicle in front of the traffic light (when the subject vehicle speed is larger than the target vehicle speed), the deceleration instruction image 17 indicating an instruction of the deceleration operation is displayed on the display screen 10a. Accordingly, the driver can easily recognize necessity of the deceleration operation, and can decelerate the subject vehicle at a good timing.

By the way, when the subject vehicle travels by the driver's operation according to display of the display screen 10a in a state where the preceding vehicle 102 exists as illustrated in FIG. 1B, the subject vehicle 101 may approach (e.g., rapidly approach) the preceding vehicle 102. Specifically, in a case where the maximum value V1 of the target vehicle speed defined by the target vehicle speed image 12 is faster than the vehicle speed of the preceding vehicle 102 and the driver referring to information regarding the target vehicle speed range drives to travel at the maximum value V1 of the target vehicle speed in order to pass through the intersection without stopping, the subject vehicle 101 approaches the preceding vehicle 102. In order to enhance safety in such a case, the present embodiment provides a driving assistance apparatus as follows.

Figure 3:
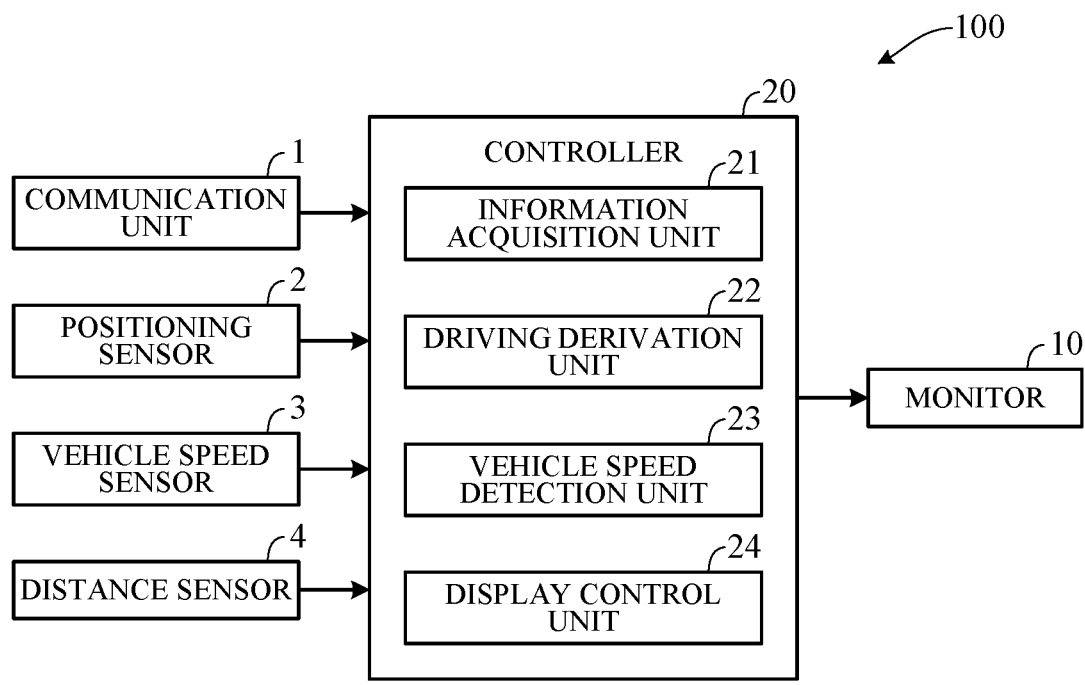
FIG. 3 is a block-diagram illustrating a configuration of a main part of the driving assistance apparatus according to the embodiment of the present invention.

FIG. 3 is a block-diagram schematically illustrating a configuration of a main part of the driving assistance apparatus 100 according to the embodiment of the present invention. As shown in FIG. 3, the driving assistance apparatus 100 includes a controller 20, and a communication unit 1, a positioning sensor 2, a vehicle speed sensor 3, distance sensor 4 and a monitor 10 which are communicably connected to the controller 20, respectively.

The communication unit 1 is configured to be capable of wirelessly communicating with the optical beacon roadside unit 202 (FIGS. 1A and 1B) provided on the road, that is, capable of road-to-vehicle communication. The communication unit 1 receives, from the communication device provided in the optical beacon roadside unit 202, the traffic light information on the traffic light located in the traveling direction of the subject vehicle, i.e., the traffic light information on the traffic light installed at the intersection where the subject vehicle passes next. The traffic light information includes position information of the traffic light and information on the switching time of the light color of the traffic light. The information on the switching time includes information on the remaining time until the traffic light is switched from green to yellow when the traffic light is currently green, and information on the remaining time until the traffic light is switched to green next when the traffic light is not currently green (for example, red).

The positioning sensor 2 receives signal for positioning transmitted from the positioning satellite. Positioning satellites are artificial satellites such as GPS satellites and quasi-zenith satellites. Using positioning information received by the positioning sensor 2, the current position of the subject vehicle (latitude, longitude, altitude) is measured. The positioning sensor 2 is used to detect the position (distance to the signal, etc.) of the subject vehicle relative to the position of the intersection where the traffic light is installed. Therefore, it is also possible to use a distance detector (radar, LIDAR, etc.) for detecting the distance from the subject vehicle to the object (object in the vicinity of the intersection) in place of the positioning sensor 2. The vehicle speed sensor 3 detects the vehicle speed of the vehicle.

The distance sensor 4 detects an inter-vehicle distance L between the subject vehicle 101 and the preceding vehicle 102 as illustrated in FIG. 1B. The distance sensor 4 can be, for example, a LIDAR that measures a distance and direction from an object (preceding vehicle) by emitting a pulsed infrared laser beam and detecting a reflected beam reflected by the object or a radar that detects a distance and direction from the object by emitting an electromagnetic wave and detecting a reflected wave. The LIDAR and the radar can also detect a speed of the object.

A controller 20 executes predetermined processing on the basis of signals from a communication unit 1, a positioning sensor 2, a vehicle speed sensor 3, and the distance sensor 4 and outputs a control signal to a monitor 10 including the display screen 10a. The controller 20 includes an electronic control unit having a microprocessor and a memory connecting the microprocessor. More specifically, the controller 20 includes a computer including a CPU, a ROM, a RAM, and other peripheral circuits such as an I/O interface. The controller 20 includes, as functional components, an information acquisition unit 21, a driving derivation unit 22, a vehicle speed detection unit 23, and a display control unit 24. A memory of the controller 20 stores road information in advance. The road information includes information regarding a legal speed of each road.

The information acquisition unit 21 acquires traffic light information received by the communication unit 1, information (position information) regarding a current position of the subject vehicle detected by the positioning sensor 2, information (vehicle speed information) regarding the vehicle speed of the subject vehicle detected by the vehicle speed sensor 3, and information (inter-vehicle distance information) regarding the inter-vehicle distance from the preceding vehicle detected by the distance sensor 4. The inter-vehicle distance information also includes the speed of the preceding vehicle. Further, the information acquisition unit 21 specifies a road on which the subject vehicle is traveling according to the position information of the subject vehicle and acquires information (legal speed information) regarding the legal speed corresponding to the road on the basis of the road information stored in advance in the memory.

The driving derivation unit 22 derives recommended driving for the driver on the basis of the traffic light information, the position information, the vehicle speed information, and the legal speed information acquired by the information acquisition unit 21. Specifically, the driving derivation unit calculates a distance between the subject vehicle and the intersection where a traffic light is installed by using the position information and also calculates a vehicle speed range in which the subject vehicle can pass through the intersection without stopping on the basis of the above distance and a remaining time until the traffic light ahead of the subject vehicle changes from green to yellow included in the traffic light information. Then, the driving derivation unit calculates, as the target vehicle speed range, a vehicle speed range equal to or lower than the legal speed within the above vehicle speed range. The target vehicle speed range is included in the recommended driving for the driver.

Meanwhile, when determining that the subject vehicle cannot pass through the intersection without stopping at the vehicle speed lower than the legal speed, the driving derivation unit 22 calculates a target vehicle speed range for the subject vehicle to smoothly stop in front of the traffic light, i.e., in front of the stop line at the intersection. Then, in case where the vehicle speed of the subject vehicle included in the vehicle speed information exceeds the target vehicle speed, the driving derivation unit derives a deceleration instruction including the target vehicle speed range as the recommended driving. Alternatively, the driving derivation unit simply derives a deceleration instruction for stopping the subject vehicle in front of the traffic light, without calculating the target vehicle speed range.

The vehicle speed detection unit 23 detects the vehicle speed of the preceding vehicle on the basis of the vehicle speed of the subject vehicle detected by the vehicle speed sensor 3 and an amount of change in the inter-vehicle distance L detected by the distance sensor 4. That is, since the amount of change in the inter-vehicle distance L per unit time corresponds to a relative vehicle speed of the preceding vehicle to the subject vehicle, the vehicle speed of the preceding vehicle is detected (calculated) by adding the relative vehicle speed to the vehicle speed of the subject vehicle. The vehicle speed of the preceding vehicle may be detected by acquiring vehicle speed information from the preceding vehicle via the communication unit 1.

The display control unit 24 controls display of the monitor 10 so as to display the recommended driving derived by the driving derivation unit 22. For example, when the driving derivation unit 22 determines that the subject vehicle can pass through the intersection without stopping in a state where no preceding vehicle exists as illustrated in FIG. 1A, the display control unit controls the monitor 10 such that, as illustrated in FIG. 2A, the target vehicle speed image 12, the subject vehicle speed image 13, and the legal speed image 14 are displayed in association with the scale image 11 and, in addition, the driving behavior image 16 indicating that the subject vehicle can pass through the intersection without stopping is displayed on the background image 15.

Meanwhile, when the driving derivation unit 22 determines that the subject vehicle cannot pass through the intersection without stopping, the display control unit 24 controls the monitor 10 such that, as illustrated in FIG. 2B, the target vehicle speed image 12, the subject vehicle speed image 13, and the legal speed image 14 are displayed in association with the scale image 11 and, in addition, the deceleration instruction image 17 indicating the deceleration operation instruction is displayed on the background image 15. The images in FIGS. 2A and 2B are display images in a case where there is no possibility of approaching the preceding vehicle in the section to the traffic light 201 or there is no possibility of approaching the preceding vehicle by a predetermined degree or more.

In the state where the preceding vehicle exists as illustrated in FIG. 1B, the display control unit 24 controls the monitor 10 as follows. First, the display control unit 24 determines whether or not the vehicle speed of the preceding vehicle detected by the vehicle speed detection unit 23 is smaller than the maximum value V1 of the target vehicle speed range derived by the driving derivation unit 22. When it is determined that the vehicle speed of the preceding vehicle is larger than or equal to the maximum value V1 of the target vehicle speed range, the subject vehicle does not approach the preceding vehicle. In this case, the display control unit controls the monitor 10 such that the image indicating the recommended driving is displayed as in FIG. 2A.

Meanwhile, when it is determined that the vehicle speed of the preceding vehicle is smaller than the maximum value V1 of the target vehicle speed range, the subject vehicle may approach the preceding vehicle. In this case, the display control unit 24 further determines whether or not the inter-vehicle distance L is equal to or less than a predetermined value La on the basis of the inter-vehicle distance information acquired by the information acquisition unit 21. The predetermined value La is set according to the vehicle speed, and the predetermined value La increases as the vehicle speed increases. In a case where the inter-vehicle distance L is larger than the predetermined value La, the display control unit controls the monitor 10 such that the images as in FIG. 2A is displayed. When the inter-vehicle distance L is equal to or smaller than the predetermined value La, the display control unit controls the monitor 10 so as to decrease the maximum value V1 of the target vehicle speed indicated by the target vehicle speed image 12.

Figure 4:
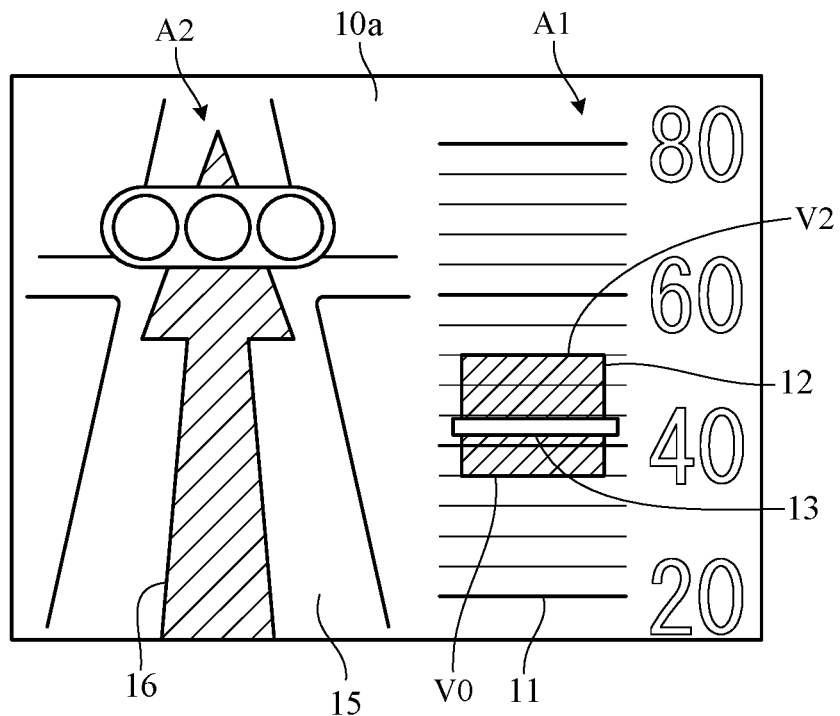
FIG. 4 is a diagram showing an example of the display screen when a preceding vehicle exists.

FIG. 4 illustrates an example thereof and is an example where the subject vehicle can pass through the intersection with a green light. As illustrated in FIG. 4, the target vehicle speed image 12 different from that in FIG. 2A is displayed on the display screen 10a. That is, the maximum value V2 of the target vehicle speed indicated by the target vehicle speed image is smaller than the maximum value V1 in FIG. 2A, and the entire length of the target vehicle speed image 12 is shorter than that in FIG. 2A. Although in FIG. 4, the display of the legal speed image 14 is omitted, the legal speed image 14 may be displayed.

The maximum value V2 of the target vehicle speed in FIG. 4 is set to, for example, the same value as the vehicle speed of the preceding vehicle. This makes it possible to prevent the subject vehicle from approaching the preceding vehicle. The maximum value V2 may be set according to the inter-vehicle distance L between the subject vehicle and the preceding vehicle. For example, the maximum value V2 may be set to a smaller value as the inter-vehicle distance L is shorter. The maximum value V2 may also be set to a smaller value as the vehicle speed of the subject vehicle is faster than the vehicle speed of the preceding vehicle. The maximum value V2 of the target vehicle speed when the preceding vehicle exists is smaller than the maximum value V1 when the preceding vehicle does not exist. Therefore, a driver drives the vehicle such that the vehicle speed falls within the target vehicle speed range, and thus, the subject vehicle can smoothly pass through an intersection, without excessively approaching the preceding vehicle. As a result, it is possible to provide useful information to the driver in a case where the preceding vehicle exists.

Figure 5:
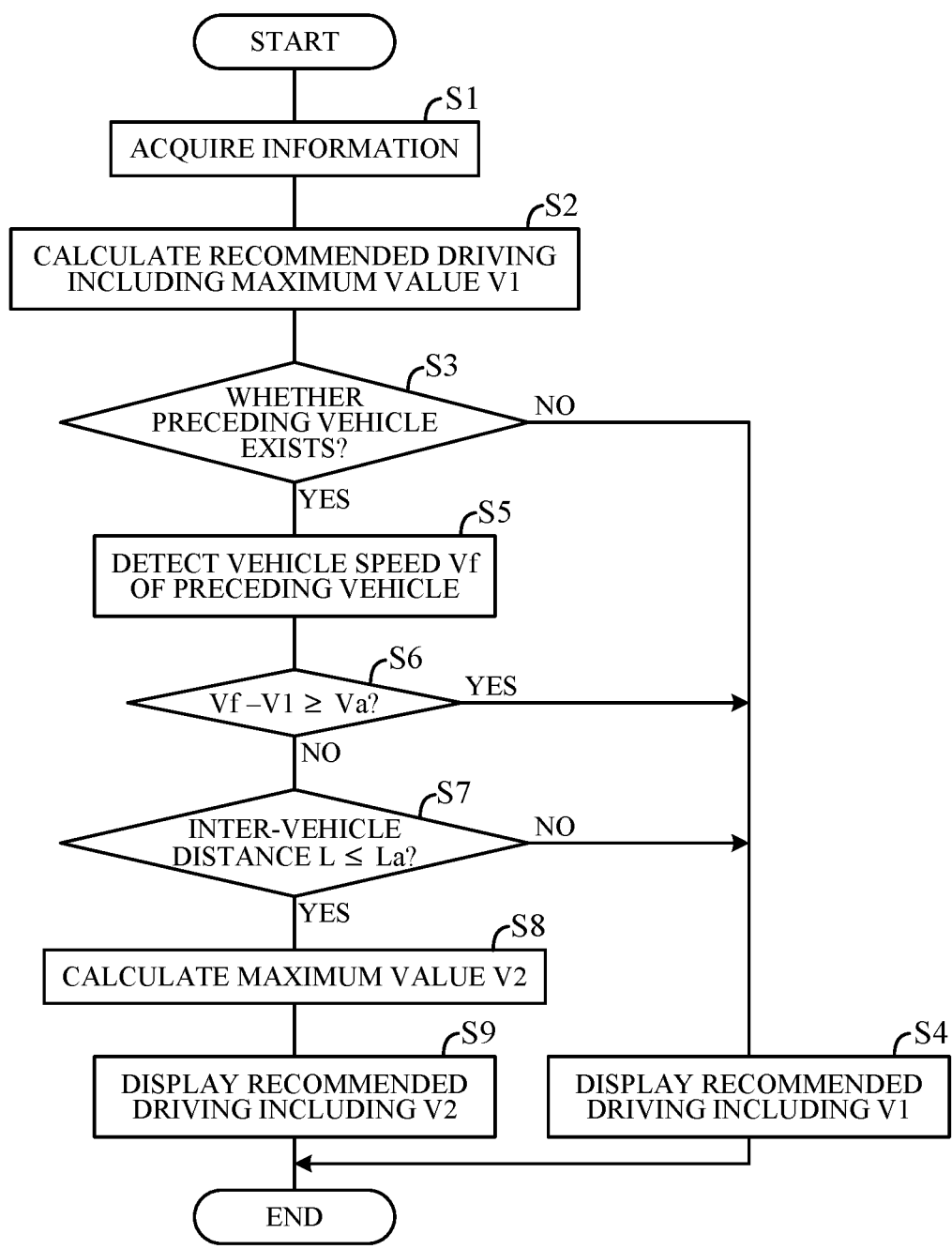
FIG. 5 is a flowchart illustrating an example of processing executed by a controller in FIG. 3.

FIG. 5 is a flowchart showing an example of processing executed by the controller 20 (microprocessor) in FIG. 3. The processing shown in the flowchart starts when, for example, a power key switch is turned on and is repeated at predetermined cycles.

As illustrated in FIG. 5, first, in S1 (S: processing step), the controller acquires the traffic light information received by the communication unit 1 and also acquires the position information of the subject vehicle based on a signal from the positioning sensor 2, the vehicle speed information based on a signal from the vehicle speed sensor 3, and the inter-vehicle distance information based on a signal from the distance sensor 4. The traffic light information includes information regarding a remaining time (green light remaining time, red light remaining time) until the traffic light is switched from green to yellow or from red to green. In S1, the controller further acquires information regarding a legal speed of a road on which the subject vehicle is traveling by referring to the road information stored in advance in the memory. The legal speed information of the road on which the subject vehicle is traveling may also be acquired by recognizing a road sign by using a vehicle-mounted camera.

Next, in S2, the controller calculates a target vehicle speed range having the legal speed as an upper limit as recommended driving for the driver on the basis of the traffic light information, the position information, and the legal speed information acquired in S1. That is, the controller calculates a target vehicle speed range in which the subject vehicle can pass through the intersection where a traffic light is installed without stopping or a target vehicle speed range in a case where the subject vehicle stops in front of the traffic light. In other words, the controller calculates the minimum value V0 and the maximum value V1 of the target vehicle speed.

Next, in S3, the controller determines whether or not a preceding vehicle exists within a predetermined distance on the basis of the signal from the distance sensor 4. The controller may determine whether or not the preceding vehicle exists on the basis of an image from a camera mounted on the subject vehicle to capture surroundings of the subject vehicle. The predetermined distance is, for example, a distance from a current location to the traffic light. When it is determined in S3 that no preceding vehicle exists, the processing proceeds to S4.

In S4, the controller outputs a control signal to the monitor 10 such that an image of the recommended driving including the target vehicle speed range calculated in S2 is displayed. For example, as illustrated in FIGS. 2A and 2B, the controller outputs a control signal to the monitor 10 such that the target vehicle speed image 12 including the minimum value V0 and the maximum value V1, the subject vehicle speed image 13, and the legal speed image 14 are displayed in association with the scale image 11 in an area A1 and, in addition, the driving behavior image 16 or the deceleration instruction image 17 is displayed on the background image 15.

Meanwhile, when it is determined in S3 that the preceding vehicle exists, the processing proceeds to S5, and the controller detects a vehicle speed Vf of the preceding vehicle on the basis of the vehicle speed information and the inter-vehicle distance information acquired in S1.

Next, in S6, the controller calculates a speed difference by subtracting the maximum value V1 of the target vehicle speed range calculated in S2 from the vehicle speed Vf detected in S5, and determines whether or not the speed difference is equal to or larger than a predetermined value (predetermined difference) Va. This determination is a determination as to whether or not the subject vehicle traveling according to the recommended driving may approach the preceding vehicle, the predetermined value is set to 0, for example. When it is determined in S6 that the speed difference is equal to or larger than the predetermined value Va, the processing proceeds to S7. If not, the processing proceeds to S4.

In S7, the controller sets the predetermined value La according to the vehicle speed by using the vehicle speed information acquired in S1 and determines whether or not the inter-vehicle distance L is equal to or smaller than the predetermined value La by using the inter-vehicle distance information. When it is determined in S7 that the inter-vehicle distance L is equal to or smaller than the predetermined value La, the processing proceeds to S8. If not, the processing proceeds to S4.

In S8, the controller calculates a maximum value V2 for displaying which is different from the maximum value V1 of the target vehicle speed included in the recommended driving calculated in S2, based on the inter-vehicle distance information acquired in S1. That is, the controller calculates a new maximum value V2 smaller than V1. For example, the controller calculates the vehicle speed Vf of the preceding vehicle detected in S5 as the maximum value V2. The controller may calculate the maximum value V2 of the target vehicle speed in accordance with the inter-vehicle distance L or in accordance with the speed difference between the subject vehicle and the preceding vehicle so that the subject vehicle does not approach the preceding too much.

Next, in S9, the controller outputs a control signal to the monitor 10 such that an image of the recommended driving including the maximum value V2 of the target vehicle speed calculated in S8 is displayed. For example, the controller controls the monitor 10 so that the image illustrated in FIG. 4 is displayed.

The operation of the driving assistance apparatus 100 according to the present embodiment is summarized as follows. For example, the image of the recommended driving in FIG. 2A is displayed on the monitor 10 in a state where the subject vehicle 101 is approaching the intersection where the traffic light 201 is installed and no preceding vehicle exists ahead of the subject vehicle 101 as illustrated in FIG. 1A. Specifically, the driving behavior image 16 indicating that the subject vehicle 101 can pass through the intersection where the traffic light 201 is installed without stopping is displayed together with the target vehicle speed image 12 indicating the target vehicle speed range for the subject vehicle to pass through the intersection without stopping, that is, the target vehicle speed image 12 indicating a range from the minimum value V0 to the maximum value V1 of the target vehicle speed (S4). Therefore, the driver can easily recognize the target vehicle speed for passing through the intersection without stopping and thus can perform a smooth traveling operation of the subject vehicle 101.

On the other hand, as illustrated in FIG. 1B, when the preceding vehicle 102 exists ahead of the subject vehicle 101 by a distance L, an image is displayed on the monitor 10 in accordance with a difference between the maximum value V1 of the target vehicle speed indicated by the target vehicle speed image 12 and the vehicle speed Vf of the preceding vehicle 102 and the inter-vehicle distance L between the subject vehicle 101 and the preceding vehicle 102. That is, when a speed difference (a difference in speed) obtained by subtracting the maximum value V1 of the target vehicle speed from the vehicle speed Vf of the preceding vehicle 102 is equal to or larger than the predetermined value Va (e.g. when the vehicle speed Vf is equal to or larger than the maximum value V1), the image indicating the recommended driving similar to that when the preceding vehicle 102 does not exist is displayed (S6→S4). Even in a case where the speed difference is smaller than the predetermined value Va, if the inter-vehicle distance L is larger than the predetermined value La, there is no possibility that the subject vehicle 101 rapidly approaches the preceding vehicle 102, and, also in this case, the image indicating the recommended driving similar to that when the preceding vehicle 102 does not exist is displayed (S7→S4).

Meanwhile, in a case where the speed difference obtained by subtracting the maximum value V1 of the target vehicle speed from the vehicle speed Vf of the preceding vehicle 102 is smaller than the predetermined value Va and the inter-vehicle distance L is equal to or smaller than the predetermined value La, for example, the image of the recommended driving including the target vehicle speed image 12 illustrated in FIG. 4 is displayed on the monitor 10 (S9). In this case, the maximum value V2 of the target vehicle speed is displayed to be more limited than the maximum value V1 in FIG. 2A (V2<V1). Therefore, even in a case where the preceding vehicle 102 exists, the subject vehicle 101 does not excessively approach the preceding vehicle 102 and can pass through the intersection without stopping if the driver drives the vehicle such that the vehicle speed of the subject vehicle falls within the target vehicle speed range. This enhances traveling safety when passing assist display for the intersection is performed.

According to the present embodiment, the following operations and effects are achievable.

(1) A driving assistance apparatus 100 according to the present embodiment includes: an information acquisition unit 21 that acquires traffic light information including switching information of a traffic light and position information indicating a position of a subject vehicle 101 with respect to the traffic light; a driving derivation unit 22 that derives recommended driving for a driver on the basis of the traffic light information and the position information acquired by the information acquisition unit 21; a monitor 10 that displays information; a display control unit 24 that controls the monitor 10 so as to notify the driver of information regarding the recommended driving derived by the driving derivation unit 22; and a detection part that detects a degree of approach between the subject vehicle 101 and a preceding vehicle 102 that travels ahead of the subject vehicle, for example, a distance sensor 4 that measures an inter-vehicle distance L between the subject vehicle 101 and the preceding vehicle 102 (FIG. 3). The display control unit 24 controls the monitor 10 such that information regarding a maximum value V1 of a recommended vehicle speed derived by the driving derivation unit 22 is displayed while being changed according to the degree of approach (e.g. the inter-vehicle distance L) between the subject vehicle 101 and the preceding vehicle 102 detected by the detection part (FIG. 5).

More specifically, the display control unit 24 controls the monitor 10 such that, when the degree of approach (e.g. the inter-vehicle distance L) between the subject vehicle 101 and the preceding vehicle 102 detected by the distance sensor 4 or the like is equal to or larger than the predetermined value La, the recommended driving information including the information regarding the maximum value V1 of the recommended vehicle speed included in the recommended driving derived by the driving derivation unit 22 is displayed, and, when the inter-vehicle distance L is smaller than the predetermined value La, the recommended driving information including the information regarding the maximum value V2 smaller than the maximum value V1 is displayed. With this configuration, it is possible to notify the driver of the target vehicle speed range in which the subject vehicle 101 does not rapidly approach the preceding vehicle 102 and can pass through the intersection without stopping. As a result, the subject vehicle can smoothly pass through the intersection while improving safety.

(2) A vehicle speed detection unit 23 detects a vehicle speed Vf of the preceding vehicle 102 that affects the degree of approach by using signal from a vehicle speed sensor 3 and a distance sensor 4. The display control unit 24 controls the monitor 10 such that, when a speed difference obtained by subtracting the maximum value V1 from the vehicle speed Vf of the preceding vehicle 102 detected by the vehicle speed detection unit 23 is equal to or larger than a predetermined value Va, the recommended driving information including the information regarding the maximum value V1 is displayed (FIG. 2A), and, when the speed difference is smaller than the predetermined value Va, the recommended driving information including the information regarding the maximum value V2 smaller than the maximum value V1 is displayed (FIG. 4). By changing display of the maximum value of the target vehicle speed according to the speed difference from the preceding vehicle 102 as described above, it is possible to notify the driver of an optimum target vehicle speed that prevents the subject vehicle 101 from approaching the preceding vehicle 102.

(3) The display control unit 24 controls the monitor 10 such that a range of the target vehicle speed is displayed by a belt-shaped target vehicle speed image 12 having a length corresponding to a range from a minimum value V0 to the maximum values V1 and V2 of the target vehicle speed (FIGS. 2A and 4). Therefore, the driver can easily recognize the target vehicle speed range on the basis of the length of the image.

The above embodiment can be modified to various forms. Several modifications will be described below. In the above embodiment, the information acquisition unit 21 acquires the traffic light information including the switching information of the traffic light transmitted from the optical beacon roadside unit 202. However, after the current position of the subject vehicle is specified by the positioning sensor 2, the information acquisition unit may acquire the traffic light information transmitted from the server device that manages the switching of the traffic light corresponding to the current position of the subject vehicle. Although in the above embodiment, the position of the subject vehicle is detected by the positioning sensor 2, the position of the subject vehicle with respect to the traffic light may be detected by using a radar, a LIDAR, or a camera.

In the above embodiment, the driving derivation unit 22 derives the recommended driving for the driver based on the traffic light information and the position information of the subject vehicle acquired by the information acquisition unit 21. Specifically, the range of the vehicle speed to be satisfied by the subject vehicle (target vehicle speed range) and the instruction to perform the deceleration operation (deceleration instruction) are derived as part of the recommended driving. However, the configuration of a derivation unit is not limited to those described above. In the above embodiment, the information on the recommended driving derived by the driving derivation unit 22 is notified to the driver via the monitor 10 (display part). However, the information may be notified to the driver by an audio output in addition to the display.

Although in the above embodiment, the maximum value of the target vehicle speed is changed from V1 (a first maximum value) to V2 (a second maximum value) on the condition that the speed difference obtained by subtracting the maximum value V1 of the target vehicle speed from the vehicle speed Vf of the preceding vehicle is smaller than the predetermined value (predetermined difference) Va and the inter-vehicle distance L is equal to or smaller than predetermined value (predetermined distance) La, the maximum value of the target vehicle speed may be changed from V1 to V2 on the condition that the speed difference obtained by subtracting V1 from the vehicle speed Vf is smaller than the predetermined value Va or the inter-vehicle distance L is equal to or smaller than the predetermined value La. Alternatively, the maximum value of the target vehicle speed may be changed from V1 to V2 in accordance with other parameters representing the degree of approach. That is, as long as controlling the monitor 10 so as to display recommended driving information including information on the maximum value V1 of the recommended vehicle speed included in the recommended driving derived by the driving derivation unit 22 (a derivation unit) when the degree of approach between the subject vehicle and the preceding vehicle is smaller than the predetermined value, and to display recommended driving information including information on other maximum value V2 when the degree of approach is equal to or larger than the predetermined value, a display control unit may be any configuration. The display control unit may control the monitor 10 so as to display recommended driving information including information on the maximum value V1 of the recommended vehicle speed when the vehicle speed Vf of the preceding vehicle 102 is equal to or larger than the maximum value V1 of the target vehicle speed or the vehicle speed Vf is equal to or larger than the vehicle speed of the subject vehicle detected by the vehicle speed sensor 3, and to display recommended driving information including information on other maximum value V2 when the vehicle speed Vf is smaller than the maximum value V1 of the target vehicle speed or the vehicle speed Vf is smaller than the vehicle speed of the subject vehicle.

In the above embodiment, the vehicle speed detection unit 23 (a vehicle speed detection part) detects using the inter-vehicle distance L detected by the distance sensor 4 and the vehicle speed detected by the vehicle speed sensor 3, and as an example of a degree of approach, and by using the vehicle speed Vf of the preceding vehicle detected by the vehicle speed detection unit 23, the speed difference between the preceding vehicle and the subject vehicle is detected (calculated). However, the configuration of a detection part detecting a degree of approach between the subject vehicle and the preceding vehicle is not limited to the above configuration. The controller calculates a rate of change of a relative speed by time-differentiating the inter-vehicle distance L between the subject vehicle and the preceding vehicle, and thereby the degree of approach may be detected.

In the above embodiment, the range of the recommended vehicle speed is displayed by the belt-shaped target vehicle speed image 12 having a length corresponding to the range from the minimum value V0 of the recommended vehicle speed (target vehicle speed) to the maximum value V1, V2. However, the configuration of a target vehicle speed image is not limited to the above configuration. For example, the minimum value and the maximum value of the recommended vehicle speed may be displayed as numerical values. Only the maximum value of the recommended vehicle speed may be displayed. An image indicating the maximum value V1 and an image indicating the maximum value V2 may be displayed differently so that the driver can recognize that the maximum value of the recommended vehicle speed is limited from V1 to V2 due to the presence of the preceding vehicle. For example, the two may be displayed in different display colors. In the above embodiment, the target vehicle speed image 12, the subject vehicle speed image 13, the legal speed image 14, and the like are displayed on the display screen 10a, but the display of the subject vehicle speed image 13 and the legal speed image 14 may be omitted.

In the above embodiment, the configuration of the driving assistance apparatus 100 is described by referring to the case where the subject vehicle passes through the intersection where the traffic light is installed. However, the traffic light may be installed in not only the intersection but also a pedestrian crossing or the like. In this case also, the driving assistance apparatus of the present invention can be applied.

The present invention can also be used as a driving assistance method including detecting a degree of approach from a subject vehicle 101 to a preceding vehicle 102 traveling ahead of the subject vehicle 101, acquiring traffic light information including switching information on a traffic light 201 and position information on a position of the subject vehicle 101 with respect to the traffic light 201, the traffic light 201 informing a driver of stopping or non-stopping at a predetermined position, deriving a recommended driving for the driver based on the traffic light information and the position information, and controlling a display part so as to notify the driver of information on a recommended vehicle speed included in the recommended driving. The controlling includes controlling the display part so as to change and display information on a maximum value V1 of the recommended vehicle speed included in the recommended driving in accordance with the degree of approach from the subject vehicle 101 to the preceding vehicle 102.

The above embodiment can be combined as desired with one or more of the above modifications. The modifications can also be combined with one another.

According to the present invention, it is possible to perform a driving assist considering safety in a case where a preceding vehicle exists.

Above, while the present invention has been described with reference to the preferred embodiments thereof, it will be understood, by those skilled in the art, that various changes and modifications may be made thereto without departing from the scope of the appended claims.

What is claimed is:

1. A driving assistance apparatus comprising:
a display part configured to display information;
a detection part configured to detect a degree of approach from a subject vehicle to a preceding vehicle traveling ahead of the subject vehicle;
a vehicle speed detection part configured to detect a vehicle speed of the preceding vehicle; and
an electronic control unit including a microprocessor and a memory connected to the microprocessor, wherein
the microprocessor is configured to perform:
acquiring traffic light information including switching information on a traffic light and position information on a position of the subject vehicle with respect to the traffic light, the traffic light informing a driver of stopping or non-stopping at a predetermined position;
deriving a recommended driving for the driver, based on the traffic light information and the position information; and
controlling the display part so as to notify the driver of information on a recommended vehicle speed included in the recommended driving, and the microprocessor is configured to perform
the controlling including controlling the display part so as to display the information on the recommended driving including a first maximum value defined as a maximum value of the recommended vehicle speed included in the recommended driving when the degree of approach detected by the detection part is smaller than a predetermined value, and to display the information on the recommended driving including a second maximum value of the recommended vehicle speed different from the first maximum value when the degree of approach is equal to or larger than the predetermined value,
the detection part is configured to detect a speed difference obtained by subtracting the first maximum value from the vehicle speed of the preceding vehicle detected by the vehicle speed detection part, and
the microprocessor is configured to further perform
the controlling including controlling the display part so as to display the information on the recommended driving including the first maximum value when the speed difference is equal to or larger than a predetermined difference, and to display the information on the recommended driving including the second maximum value smaller than the first maximum value when the speed difference is smaller than the predetermined difference.

2. The driving assistance apparatus according to claim 1, wherein
the microprocessor is configured to perform
the controlling including controlling the display part so that a range of the recommended vehicle speed is displayed by an image formed in a band shape having a length corresponding to a range from a minimum value to the maximum value of the recommended vehicle speed.

3. The driving assistance apparatus according to claim 1, wherein
the microprocessor is configured to perform
the controlling including controlling the display part so as to display a driving behavior image indicating a driving behavior of the subject vehicle traveling without stopping at the predetermined position in addition to the information on the maximum value of the recommended vehicle speed.

4. A driving assistance method comprising:
detecting a degree of approach from a subject vehicle to a preceding vehicle traveling ahead of the subject vehicle;
acquiring traffic light information including switching information on a traffic light and position information on a position of the subject vehicle with respect to the traffic light, the traffic light informing a driver of stopping or non-stopping at a predetermined position;
deriving a recommended driving for the driver, based on the traffic light information and the position information; and
controlling a display part so as to notify the driver of information on a recommended vehicle speed included in the recommended driving, wherein
the controlling includes controlling the display part so as to display the information on the recommended driving including a first maximum value defined as a maximum value of the recommended vehicle speed included in the recommended driving when the degree of approach is smaller than a predetermined value, and to display the information on the recommended driving including a second maximum value of the recommended vehicle speed different from the first maximum value when the degree of approach is equal to or larger than the predetermined value, the detecting includes detecting a speed difference obtained by subtracting the first maximum value from a vehicle speed of the preceding vehicle, and the controlling further includes controlling the display part so as to display the information on the recommended driving including the first maximum value when the speed difference is equal to or larger than a predetermined difference, and to display the information on the recommended driving including the second maximum value smaller than the first maximum value when the speed difference is smaller than the predetermined difference.

5. A driving assistance apparatus comprising:

a display part configured to display information;

a detection part configured to detect a degree of approach from a subject vehicle to a preceding vehicle traveling ahead of the subject vehicle;

a vehicle speed detection part configured to detect a vehicle speed of the preceding vehicle; and an electronic control unit including a microprocessor and a memory connected to the microprocessor, wherein the microprocessor is configured to perform:

acquiring traffic light information including switching information on a traffic light and position information on a position of the subject vehicle with respect to the traffic light, the traffic light informing a driver of stopping or non-stopping at a predetermined position;

deriving a recommended driving for the driver, based on the traffic light information and the position information; and controlling the display part so as to notify the driver of information on a recommended vehicle speed included in the recommended driving, and the microprocessor is configured to perform the controlling including controlling the display part so as to display the information on the recommended driving including a first maximum value defined as a maximum value of the recommended vehicle speed included in the recommended driving when the degree of approach detected by the detection part is smaller than a predetermined value, and to display the information on the recommended driving including a second maximum value of the recommended vehicle speed different from the first maximum value when the degree of approach is equal to or larger than the predetermined value, and the microprocessor is configured to further perform the controlling including controlling the display part so as to display the information on the recommended driving including the first maximum value when the vehicle speed of the preceding vehicle detected by the vehicle speed detection part is equal to or larger than the first maximum value, and to display the information on the recommended driving including the second maximum value smaller than the first maximum value when the vehicle speed of the preceding vehicle is smaller than the first maximum value.

6. The driving assistance apparatus according to claim 5, wherein the microprocessor is configured to perform the controlling including controlling the display part so that a range of the recommended vehicle speed is displayed by an image formed in a band shape having a length corresponding to a range from a minimum value to the maximum value of the recommended vehicle speed.

7. The driving assistance apparatus according to claim 5, wherein the microprocessor is configured to perform the controlling including controlling the display part so as to display a driving behavior image indicating a driving behavior of the subject vehicle traveling without stopping at the predetermined position in addition to the information on the maximum value of the recommended vehicle speed.

* * * * *